Sept. 11, 1962  A. FISCHER  3,053,193
ROTARY POSITIVE DISPLACEMENT FLUID PRESSURE DEVICE
Filed Feb. 16, 1960

INVENTOR.
ARNO FISCHER
BY
ATTORNEY.

United States Patent Office 3,053,193
Patented Sept. 11, 1962

3,053,193
ROTARY POSITIVE DISPLACEMENT FLUID
PRESSURE DEVICE
Arno Fischer, Muspillistrasse 27, Munich-
Oberföhring, Germany
Filed Feb. 16, 1960, Ser. No. 9,106
2 Claims. (Cl. 103—143)

The present invention relates to a rotary fluid pressure machine or similar device of the positive displacement type which may be used as a motor, pump, mechanical coupling or torque transmission device. The fluid may be a gas, a liquid, a vapor or a mixture thereof.

The present application concerns a modification of the device disclosed and claimed in my copending application, Serial No. 751,317, filed on July 28, 1958, now abandoned.

The fluid pressure device comprises inner and outer coaxially disposed cylindrical members. There is a regularly arranged series of axially extending sliding contact barrier members which are carried by one of the cylindrical members and which engage the surface of the other cylindrical member in a circumferentially movable pressure tight manner. There is a regularly arranged series of revoluble tubular barrier members which engage the surface of the other cylindrical member with rolling contact, likewise in a pressure tight manner. Each of the rolling contact barrier members is positively driven by gearing and is longitudinally slotted to receive one of the sliding contact barrier members so that the tubular rolling contact member may pass the sliding contact member without appreciable leakage of pressure fluid past any sliding contact member at any time.

Two successive sliding contact barrier members define a pressure chamber between them through which one of the rolling contact members moves operating as a unidirectionally moving piston. Each pressure chamber is provided with an inlet and an outlet which are disposed at opposite ends of each pressure chamber. Each sliding barrier member has an inlet for one pressure chamber adjacent to it and an outlet for another adjacent pressure chamber disposed adjacent to the same sliding barrier members at the side opposite the inlet.

In positive displacement machines of this character, an important problem is to maintain a good seal so that the leakage of pressure fluid is minimized. The present invention provides simple and efficient means for obtaining a seal which is superior to that of conventional devices of this type.

The invention will be better understood upon reading the following specification together with the accompanying drawing forming a part hereof.

Referring to the drawing.

Figure 3:
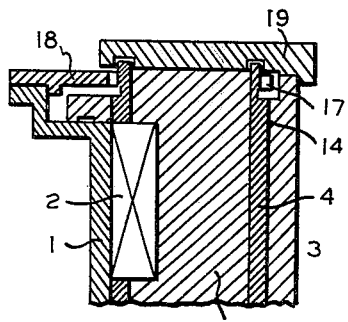
FIGURE 3 is a fragmentary view similar to FIG. 2 showing a modification.

The outer cylindrical member 1 has fixed to its inner surface sliding contact barrier members 2. The sliding contact barrier members 2 are formed of material having a suitable degree of resiliency. The barrier members 2 are regularly arranged about the axis of the outer cylindrical member 1. The free end surface 2a of each barrier member 2 slidingly engages the outer surface of the inner cylindrical member 2 which is coaxial with the outer cylindrical member 1. The outer cylindrical member 1 may be stationary, in which case the inner cylindrical member 3 is freely revoluble. Alternatively, the inner cylindrical member 3 may be stationary and the outer cylindrical member 1 freely revoluble. When the device is used as a coupling, both cylindrical members 1 and 2 are freely revoluble so that one member can drive the other.

A series of tubular rollers 4 which operate as rolling contact barrier members is revolubly mounted on the inner cylindrical member 3. Each roller or tubular rolling contact member 4 engages the inner surface of the outer cylindrical member 1. The rotational axis of each roller 4 is parallel to the common rotational axis of the cylindrical members 1 and 2. A bar 3a or 3b is disposed within the interior 5 of each tubular member 4.

Figure 1:
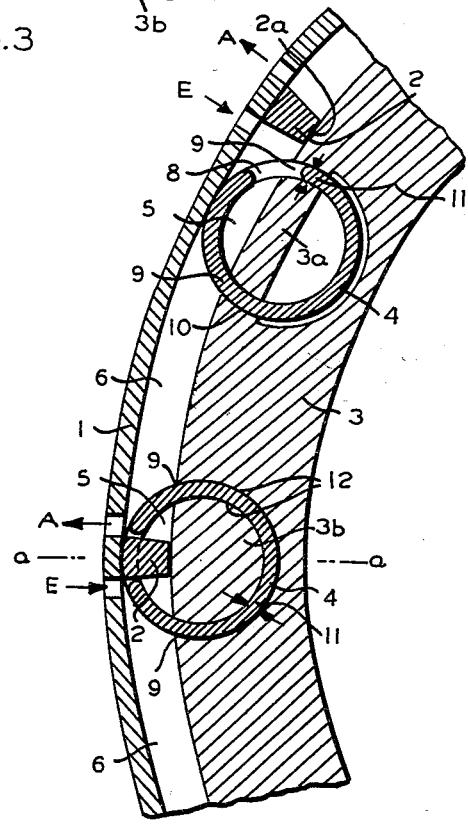
FIGURE 1 is a fragmentary view of a device embodying the invention, the view being in transverse section taken along the line b—b of FIG. 2.

Between any two consecutive sliding contact members 2 there is defined a pressure chamber 6 having an inlet passage E and an outlet passage A. Each inlet passage E is disposed adjacent to one side of a sliding contact member 2. Each outlet passage A is likewise disposed adjacent to the other side of a sliding contact member 2. As shown in FIG. 1, the tubular rolling contact members 4 are so arranged that there is always at least one tubular member 4 interposed between the inlet passage E and the outlet passage A of every pressure chamber 6. The length of each sliding contact member 2, indicated by the dimension 7 in FIG. 2, is less than the length of the inner cylindrical member 3.

Each rolling contact member 4 has a longitudinal slot 8 formed therein the length of which is coextensive with the dimension 7. The slot 8 is shown as having rounded edges. The tubular member 4 passes through slots 9 which are defined by the space between the confronting edges of the outer surface of inner cylindrical member 3 and the bar 3a. As indicated at 10, each slot 9 is of the same length as the thickness of the bar 3a, to reduce the area of frictional engagement between the rolling contact member 4 and the sides of the slot. The sides of the slot 9 are curved concentrically with the rotational axis of the rolling contact member 4. The outer faces of the bars 3a and 3b are curved concentrically with the common rotational axis of the outer and inner cylindrical members 1 and 3 and are arranged as continuations of the outer surface of the inner cylindrical member 3. The sliding contact surfaces 2a of the barrier members 2 are wider than the slots 9 so that the wiping contact barrier members 2 will slide smoothly over the slots and the sealing action will be continuously maintained.

The bar 3a and rolling contact member 4 are disposed in an axially extending recess 11 formed in the inner cylindrical member 3. The bar 3b is disposed in an axially extending recess 11 of segmental circular cross-section with which it defines a slot of gapped annular cross-section having sides 12. The rolling contact member 4 associated with the bar 3b engages the sides 12 of the gapped annular slot throughout the entire length of the slot. It will be observed that the width of the slot 8 in the rolling contact member 4 is wider than the width of the sliding contact member 2. No sealing engagement with the edges of the slot 8 is needed because the sliding contact member 2, as noted above, maintains a continuous seal.

Figure 2:
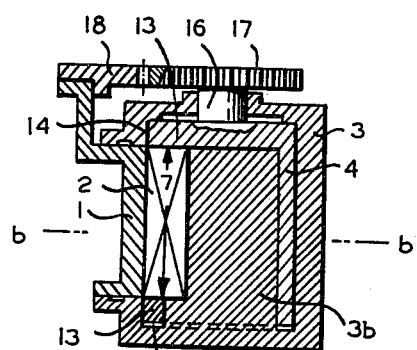
FIGURE 2 is a view in axial section taken along the line a—a of FIG. 1.

Referring to FIG. 2, the lower portion 13 of the rolling contact member 4, beyond the dimension 7, is of full instead of gapped circular cross-section. The upper portion 14 is of solid cylindrical cross-section. The lower end portion 13 of the rolling contact member 4 engages a bearing washer 15 which surrounds the bar 3b. The lower end of the bar 3b is attached to or is formed integrally with the inner cylindrical member 3.

The rolling contact member 4 is formed with a drive shaft extension 16 which is journaled in the inner cylindrical member 3. A drive gear 17, formed as a pinion, is fixed to the upper end of the shaft extension 16 and meshes with an internally toothed ring gear 18. The ring gear 18 is fixed to the outer cylindrical member 1.

In the modification of FIG. 3, the fully cylindrical portion 14 of the rolling contact member 4 is extended upwardly, and the drive gear 17 is formed as an externally toothed ring gear. Alternatively, the teeth of the drive gear 17 may be integral with the rolling contact member 4. In FIG. 3, the washer 15 is omitted and the rolling contact member 4 is supported by a plate 19 which revolubly engages the upper end of the bar 3b.

Figure 4:
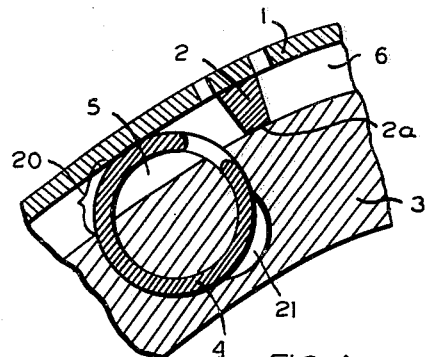
FIGURE 4 is a view similar to FIG. 1 showing a modification arranged to provide pressure equalization for the rolling contact member.

In FIG. 4, means are provided for pressure equalization. It is assumed, in FIG. 4, that the inner cylindrical member 3 rotates in a counterclockwise direction and that the outer cylindrical member 1 is stationary. It is further assumed that the device is operating as a pump which forces liquid out of the outlet apertures A. In this case, fluid pressure is applied to the area 20 of the rolling contact member 4. To balance this fluid pressure, an equalizing passage 21 formed in the inner cylindrical member 3 extends along the side of the rolling contact member 4 diametrically opposite the fluid pressure area 20. The contact area between the equalizing passage 21 and the rolling contact member 4 is equal to the area 20. By connecting the equalizing passage 21 with the outlet A, the pressure on the area 20 is balanced and frictional forces caused by the pumping action are avoided. The equalizing passage 21 may, of course, be connected to some other suitable source of pressure fluid and the contact area of the equalizing passage 21 may be changed. In such case, the pressure in the passage 21 must be adjusted accordingly.

In operation, the incomplete circular cross-section of the rolling contact members 4 causes them to be inherently somewhat flexible. This inherent flexibility enhances the sealing engagement between the inner surface of the outer cylindrical member 1 and the outer surfaces of the rolling contact members 4.

While I have shown what I believed to be the best embodiments of my invention, it will be apparent to those skilled in the art that various modifications may be made therein without departing from the spirit and scope of the invention as defined in the appended claims.

What is claimed is:

1. In a fluid flow control machine, in combination: coaxial inner and outer hollow cylindrical members disposed one within the other and rotatable with respect to each other on a common axis, said members being radially spaced to define a cylindrical space therebetween, a plurality of circumferentially spaced barrier members secured to the outer cylindrical member and having ends slidably contacting the inner cylindrical member, said barrier members defining ends of a series of chambers between the outer and inner cylindrical members, the outer cylindrical member having circumferentially spaced passages on opposite sides of each barrier member to define a fluid inlet passage at one end of each chamber and a fluid outlet passage at a circumferentially spaced other end of the chamber, the inner cylindrical member being formed with a series of curved recesses each opening at two circumferentially spaced points around the inner cylindrical member, and a plurality of tubular rollers respectively disposed in the recesses, said rollers being rotatable in the recesses on axes parallel to the common axis of the cylindrical members and revolvable around said common axis, each roller projecting radially across said circumferential space and rollably contacting the outer cylindrical member, each of said rollers having a longitudinal slot with curved circumferentially spaced confronting edges to receive each barrier member in turn as the rollers rotate and revolve around said common axis, said ends of the barrier members remaining in sliding contact with the inner cylindrical member and sealing thereat each chamber while received in each roller in turn.

2. In a fluid flow control machine, the combination according to claim 1, wherein the ends of the barrier members contacting the inner cylindrical member are wider circumferentially of the inner cylindrical member than the circumferential width of each opening of each of said recesses to close the opening when each barrier member slides thereof, the rotational axes of said rollers being axially spaced circumferentially of the cylindrical members less than the circumferential spacing of the barrier members, with at least one roller disposed in each chamber separating the inlet and outlet passages thereof during relative rotation of the cylindrical members.

References Cited in the file of this patent

UNITED STATES PATENTS

| | | |
|---|---|---|
| 127,358 | Moore et al. | May 28, 1872 |
| 968,653 | Gross | Aug. 30, 1910 |
| 1,869,053 | Dudley | July 26, 1932 |
| 2,182,719 | Booth | Dec. 5, 1939 |
| 2,776,086 | Selden | Jan. 1, 1957 |

FOREIGN PATENTS

| | | |
|---|---|---|
| 351,207 | Great Britain | June 25, 1931 |